United States Patent
Bourke et al.

(10) Patent No.: US 9,971,747 B2
(45) Date of Patent: *May 15, 2018

(54) SYSTEMS AND METHODS FOR ALERT MANAGEMENT

(71) Applicant: SweetLabs, Inc., San Diego, CA (US)

(72) Inventors: Adrian Bourke, San Diego, CA (US);
Blake Machado, Coronado, CA (US);
Brian Sleiter, San Diego, CA (US)

(73) Assignee: SweetLabs, Inc., San Diego, CA (US)

( * ) Notice: Subject to any disclaimer, the term of this patent is extended or adjusted under 35 U.S.C. 154(b) by 981 days.

This patent is subject to a terminal disclaimer.

(21) Appl. No.: 14/282,327

(22) Filed: May 20, 2014

(65) Prior Publication Data

US 2014/0258845 A1    Sep. 11, 2014

Related U.S. Application Data

(63) Continuation of application No. 13/843,343, filed on Mar. 15, 2013, now Pat. No. 8,775,917.
(Continued)

(51) Int. Cl.
*G06F 17/00* (2006.01)
*G06F 17/22* (2006.01)
(Continued)

(52) U.S. Cl.
CPC .......... *G06F 17/2247* (2013.01); *G06F 9/542* (2013.01); *G06F 17/248* (2013.01);
(Continued)

(58) Field of Classification Search
CPC ............... G06F 17/2247; G06F 17/248; G06F 17/30864; G06F 9/542; G06F 17/30899; G06F 9/4443
(Continued)

(56) References Cited

U.S. PATENT DOCUMENTS

| 5,916,310 A | 6/1999 | McCain |
| 6,018,343 A | 1/2000 | Wang et al. |

(Continued)

FOREIGN PATENT DOCUMENTS

| CN | 1322325 A | 11/2001 |
| WO | 2006120280 A1 | 11/2006 |

(Continued)

OTHER PUBLICATIONS

Davidyuk et al., Context-Aware Middleware for Mobile Multimedia Applications, ACM 2004, pp. 213-220.*
(Continued)

*Primary Examiner* — Cong-Lac Huynh
(74) *Attorney, Agent, or Firm* — KPPB LLP

(57) ABSTRACT

Systems and methods for alert management in accordance with embodiments of the invention are disclosed. In one embodiment, a computing device includes a processor, an operating system configuring the processor to create a computing environment, an alert platform application, an alert pop up page file stored within the storage and containing instructions written in the rendering language to render a pop up page, and an alert history database containing alert data including an alert ID, display metadata, and application data, wherein the alert history database is configured to be queried to retrieve alert data, wherein the alert platform application is configured to query the alert history database to retrieve alert data, and wherein the alert platform application is configured to inject at least a portion of display metadata from alert data into the instructions from the alert pop up page file and render an alert pop up page.

24 Claims, 10 Drawing Sheets

Related U.S. Application Data

(60) Provisional application No. 61/681,547, filed on Aug. 9, 2012.

(51) Int. Cl.
  *G06F 17/24* (2006.01)
  *G06F 17/30* (2006.01)
  *G06F 9/54* (2006.01)
  G06F 9/44 (2018.01)

(52) U.S. Cl.
  CPC .. *G06F 17/30864* (2013.01); *G06F 17/30899* (2013.01); *G06F 9/4443* (2013.01)

(58) Field of Classification Search
  USPC .................................. 715/200, 273
  See application file for complete search history.

(56) References Cited

U.S. PATENT DOCUMENTS

| | | |
|---|---|---|
| 6,094,671 A | 7/2000 | Chase et al. |
| 6,216,141 B1 | 4/2001 | Straub et al. |
| 6,327,628 B1 | 12/2001 | Anuff et al. |
| 6,456,307 B1 | 9/2002 | Bates et al. |
| 6,697,838 B1 | 2/2004 | Jakobson |
| 6,718,516 B1 | 4/2004 | Claussen et al. |
| 6,810,410 B1 | 10/2004 | Durham |
| 6,909,992 B2 | 6/2005 | Ashley |
| 6,981,212 B1 | 12/2005 | Claussen |
| 6,992,589 B2 | 1/2006 | Marsh |
| 7,051,288 B2 | 5/2006 | Bennett et al. |
| 7,207,000 B1 | 4/2007 | Shen et al. |
| 7,272,786 B1 | 9/2007 | McCullough |
| 7,401,325 B2 | 7/2008 | Backhouse et al. |
| 7,614,018 B1 | 11/2009 | Ohazama et al. |
| 7,636,683 B1 | 12/2009 | Mills et al. |
| 7,681,134 B1 | 3/2010 | Grechishkin et al. |
| 7,734,583 B2 | 6/2010 | Vitanov et al. |
| 7,925,988 B2 | 4/2011 | Abernethy, Jr. et al. |
| 7,950,026 B1 | 5/2011 | Urbach |
| 7,996,785 B2 | 8/2011 | Neil |
| 8,046,672 B2 | 10/2011 | Hegde et al. |
| 8,176,321 B1 | 5/2012 | Perry et al. |
| 8,209,598 B1 | 6/2012 | Pandey |
| 8,260,845 B1 | 9/2012 | Colton et al. |
| 8,296,643 B1 | 10/2012 | Vasilik |
| 8,296,684 B2 | 10/2012 | Duarte et al. |
| 8,335,817 B1 | 12/2012 | Dayan |
| 8,346,222 B2 | 1/2013 | Zubas et al. |
| 8,429,546 B2 | 4/2013 | Hilerio et al. |
| 8,434,135 B2 | 4/2013 | Hilerio et al. |
| 8,453,065 B2 | 5/2013 | Chaudhrl et al. |
| 8,458,612 B2 | 6/2013 | Chatterjee et al. |
| 8,555,155 B2 | 10/2013 | Harrison et al. |
| 8,566,697 B2 | 10/2013 | Meredith et al. |
| 8,756,488 B2 | 6/2014 | Meredith et al. |
| 8,775,917 B2 | 7/2014 | Bourke et al. |
| 8,775,925 B2 | 7/2014 | Bourke et al. |
| 8,782,033 B2 * | 7/2014 | Jiang ............... G06F 17/30864 707/710 |
| 8,799,771 B2 | 8/2014 | Bourke et al. |
| 9,069,735 B2 | 6/2015 | Bourke et al. |
| 9,141,266 B2 * | 9/2015 | McCormick ......... G06F 3/0484 |
| 9,235,803 B2 * | 1/2016 | Claux ..................... G06N 5/02 |
| 9,448,680 B2 * | 9/2016 | Woley ................. G06F 1/3209 |
| 9,547,725 B2 * | 1/2017 | Chu ................ G06F 17/30899 |
| 9,596,672 B2 * | 3/2017 | Kim .................... H04W 68/02 |
| 2002/0129064 A1 | 9/2002 | Guthrie |
| 2004/0081310 A1 | 4/2004 | Lueckhoff |
| 2004/0177327 A1 | 9/2004 | Kieffer |
| 2004/0205531 A1 | 10/2004 | Innes |
| 2004/0221170 A1 | 11/2004 | Colvin et al. |
| 2004/0268225 A1 | 12/2004 | Walsh et al. |
| 2005/0005234 A1 | 1/2005 | Chen |
| 2005/0102374 A1 | 5/2005 | Moragne et al. |
| 2005/0108678 A1 | 5/2005 | Goodwin et al. |
| 2005/0210412 A1 | 9/2005 | Matthews |
| 2006/0005187 A1 | 1/2006 | Neil |
| 2006/0026438 A1 | 2/2006 | Stern |
| 2006/0059422 A1 | 3/2006 | Wu et al. |
| 2006/0161631 A1 | 7/2006 | Lira |
| 2006/0224989 A1 | 10/2006 | Pettiross et al. |
| 2006/0265280 A1 | 11/2006 | Nakada et al. |
| 2007/0050777 A1 | 3/2007 | Hutchinson et al. |
| 2007/0255814 A1 | 11/2007 | Green et al. |
| 2007/0277109 A1 | 11/2007 | Chen et al. |
| 2008/0021696 A1 | 1/2008 | Bartelt et al. |
| 2008/0040226 A1 | 2/2008 | Roker |
| 2008/0082565 A1 | 4/2008 | Chang et al. |
| 2008/0108333 A1 | 5/2008 | Jemison et al. |
| 2008/0140529 A1 | 6/2008 | Agarwal et al. |
| 2008/0154718 A1 | 6/2008 | Flake et al. |
| 2008/0172736 A1 | 7/2008 | Barr et al. |
| 2008/0208589 A1 | 8/2008 | Cross et al. |
| 2008/0256636 A1 | 10/2008 | Gassoway |
| 2009/0019371 A1 | 1/2009 | Audet |
| 2009/0019436 A1 | 1/2009 | Hartz et al. |
| 2009/0070228 A1 | 3/2009 | Ronen |
| 2009/0077174 A1 | 3/2009 | Janssen et al. |
| 2009/0125833 A1 | 5/2009 | Abernethy, Jr. et al. |
| 2009/0132556 A1 | 5/2009 | Gupta et al. |
| 2009/0171974 A1 | 7/2009 | Arthursson et al. |
| 2009/0171993 A1 | 7/2009 | Arthursson |
| 2009/0187928 A1 | 7/2009 | Mark |
| 2009/0217179 A1 | 8/2009 | Mons et al. |
| 2009/0249188 A1 | 10/2009 | Dube et al. |
| 2009/0249238 A1 | 10/2009 | Chudy et al. |
| 2009/0271394 A1 | 10/2009 | Allen et al. |
| 2009/0282333 A1 | 11/2009 | Olsen et al. |
| 2010/0017701 A1 | 1/2010 | Bargeron |
| 2010/0023884 A1 | 1/2010 | Brichford et al. |
| 2010/0054128 A1 * | 3/2010 | O'Hern ................ H04L 67/36 370/235 |
| 2010/0114887 A1 | 5/2010 | Conway et al. |
| 2010/0146529 A1 | 6/2010 | Heath et al. |
| 2010/0205523 A1 | 8/2010 | Lehota et al. |
| 2010/0211906 A1 | 8/2010 | Kanai |
| 2010/0228594 A1 | 9/2010 | Chweh et al. |
| 2010/0233996 A1 | 9/2010 | Herz et al. |
| 2010/0306762 A1 | 12/2010 | Lindberg et al. |
| 2011/0016169 A1 | 1/2011 | Cahill et al. |
| 2011/0055005 A1 | 3/2011 | Lang |
| 2011/0093900 A1 | 4/2011 | Patel et al. |
| 2011/0138295 A1 | 6/2011 | Momchilov et al. |
| 2011/0138314 A1 | 6/2011 | Mir et al. |
| 2011/0153806 A1 | 6/2011 | Bagasra |
| 2011/0225178 A1 | 9/2011 | Ingrassia |
| 2011/0289422 A1 | 11/2011 | Spivack et al. |
| 2011/0307738 A1 | 12/2011 | Hilerio et al. |
| 2011/0307880 A1 | 12/2011 | Hilerio et al. |
| 2011/0307883 A1 | 12/2011 | Hilerio et al. |
| 2011/0307946 A1 | 12/2011 | Hilerio et al. |
| 2011/0314389 A1 | 12/2011 | Meredith et al. |
| 2012/0005346 A1 | 1/2012 | Burckart |
| 2012/0030617 A1 | 2/2012 | Louch |
| 2012/0047442 A1 | 2/2012 | Nicolaou et al. |
| 2012/0066583 A1 | 3/2012 | Priestley et al. |
| 2012/0066634 A1 | 3/2012 | Kim et al. |
| 2012/0084292 A1 | 4/2012 | Liang et al. |
| 2012/0084713 A1 | 4/2012 | Desai et al. |
| 2012/0096396 A1 | 4/2012 | Ording et al. |
| 2012/0150963 A1 | 6/2012 | Horowitz et al. |
| 2012/0151368 A1 | 6/2012 | Tam |
| 2012/0166956 A1 | 6/2012 | Hilerio et al. |
| 2012/0166959 A1 | 6/2012 | Hilerio et al. |
| 2012/0173312 A1 | 7/2012 | Kern |
| 2012/0174075 A1 | 7/2012 | Carteri et al. |
| 2012/0233243 A1 | 9/2012 | Ashkenazy et al. |
| 2012/0235912 A1 | 9/2012 | Laubach |
| 2012/0266186 A1 | 10/2012 | Parzygnat |
| 2012/0290919 A1 | 11/2012 | Melnyk et al. |
| 2012/0296959 A1 | 11/2012 | Momchilov et al. |
| 2012/0297291 A1 | 11/2012 | Fainberg et al. |
| 2012/0297377 A1 | 11/2012 | Chen et al. |

(56) References Cited

U.S. PATENT DOCUMENTS

| | | |
|---|---|---|
| 2012/0311419 A1 | 12/2012 | Kwak et al. |
| 2012/0324338 A1 | 12/2012 | Meredith et al. |
| 2013/0024763 A1 | 1/2013 | Nemati et al. |
| 2013/0073401 A1 | 3/2013 | Cook |
| 2013/0081081 A1 | 3/2013 | Wang |
| 2013/0111341 A1 | 5/2013 | Bier |
| 2013/0124211 A1 | 5/2013 | McDonough |
| 2013/0124557 A1 | 5/2013 | Goode et al. |
| 2013/0145348 A1 | 6/2013 | Agovic et al. |
| 2013/0173319 A1 | 7/2013 | Thomas et al. |
| 2013/0197972 A1 | 8/2013 | Taguchi et al. |
| 2013/0238999 A1* | 9/2013 | Helms ............... G06F 3/165 715/727 |
| 2013/0246906 A1 | 9/2013 | Hamon |
| 2013/0262168 A1 | 10/2013 | Makanawala et al. |
| 2013/0268837 A1 | 10/2013 | Braithwaite |
| 2013/0282798 A1* | 10/2013 | McCarthy ............ G06F 9/5072 709/203 |
| 2013/0290879 A1 | 10/2013 | Greisson |
| 2013/0304581 A1 | 11/2013 | Soroca et al. |
| 2014/0053107 A1 | 2/2014 | Patel |
| 2014/0074712 A1* | 3/2014 | Palmer ............. G06Q 20/1235 705/44 |
| 2014/0208336 A1* | 7/2014 | Shia ................ G06Q 10/10 719/318 |
| 2014/0236756 A1 | 8/2014 | Bourke et al. |
| 2014/0358657 A1* | 12/2014 | Smullen ............ G06Q 30/0239 705/14.19 |
| 2015/0332287 A1* | 11/2015 | Arroyo ............... G06Q 50/00 705/7.26 |
| 2016/0110066 A1* | 4/2016 | McCormick ......... G06F 3/0484 715/243 |

FOREIGN PATENT DOCUMENTS

| | | |
|---|---|---|
| WO | 2011160139 A1 | 12/2011 |
| WO | 2013074713 A1 | 5/2013 |
| WO | 2014025544 A1 | 2/2014 |

OTHER PUBLICATIONS

Fensternacher et al., A Lightweight Framework for Cross-Application User Monitoring, IEEE 2002, pp. 51-59.*

Chouwdhary et al., Model-Driven Dashboards for Business Performance Reporting, IEEE 2006, pp. 1-10.*

International Search Report and Written Opinion for International Application No. PCT/US13/52042, Completed Dec. 13, 2013, dated Dec. 23, 2013, 12 pgs.

International Search Report and Written Opinion for International Application No. PCT/US2009/36069, completed Jun. 23, 2009, dated Jul. 7, 2009, 8 pgs.

International Search Report and Written Opinion for International Application No. PCT/US2012/65136, Search Completed Jan. 29, 2013, dated Feb. 8, 2013, 7 pgs.

International Search Report and Written Opinion for International Application No. PCT/US2013/052562, Search Completed Jan. 30, 2014, dated Feb. 7, 2014, 5 pgs.

International Search Report and Written Opinion for International Application No. PCT/US2013/052861, Search Completed Jan. 29, 2014, dated Feb. 21, 2014, 8 pgs.

International Search Report and Written Opinion for International Application No. PCT/US2013/057087, Search Completed Feb. 27, 2014, dated Mar. 19, 2014, 10 pgs.

International Search Report and Written Opinion for International Application PCT/US2011/041129, Report completed Sep. 22, 2011; 15 pgs.

"How to Use the Remote Shutdown Tool to Shut Down and Restart a computer in Windows 2000, published Jul. 5, 2006, pp. 1-2", printed from http://support.microsoft.com/kb/317371.

Heino et al., "Developing Semantic Web Applications with the OntoWiki Framework," Springer 2009, pp. 61-77.

Laufer, "A Hike through Post-EJB J2EE Web Application Architecture", IEEE, 2005, 80-88.

Lee et al., "Integrating Service Composition Flow with User Interactions", IEEE, 2008, 103-108.

Mikkonen et al., "Towards a Uniform Web Application Platform for Desktop Computers and Mobile Devices", ACM, 2008, pp. 1-29.

Oren, "SemperWiki: A Semantic Personal Wiki," Google 2005, pp. 1-16.

Sen et al., "Feed Me: A Collaboration Alert Filtering System," ACM 2006, pp. 89-98.

Stearn, "XULRunner: A New Approach for Developing Rich Internet Applications", IEEE, 2007, pp. 67-73.

Sugawara et al., "A Novel Intuitive GUI Method for User-friendly Operation", Google 2009, 235-246.

International Preliminary Report on Patentability for International Application PCT/US2013/052042, Report Issued Feb. 10, 2015, dated Feb. 19, 2015, 10 pgs.

Written Opinion of the International Searching Authority for International Application No. PCT/US2009/36069, date completed Jun. 27, 2009, dated Jul. 7, 2009, 5 pgs.

Written Opinion Report for International Application PCT/US2011/041129, Report completed Sep. 22, 2011, 12 pgs.

Pokki, Download Free Desktop Apps and games, available at http://web.archive.org/web/20150105201753/https://www.pokki.com/, Jan. 15, 2013.

* cited by examiner

SYSTEMS AND METHODS FOR ALERT MANAGEMENT

CROSS REFERENCE TO RELATED APPLICATIONS

The present invention is a continuation of U.S. patent application Ser. No. 13/843,343, filed Mar. 15, 2013, that claims priority to U.S. Provisional Patent Application Ser. No. 61/681,547 entitled "Systems and Methods for Application Alert Management", filed Aug. 9, 2012, the disclosures of which are herein incorporated by reference in their entirety.

FIELD OF THE INVENTION

The present invention is generally related to managing alerts from multiple applications and more specifically to software applications that manage alerts from a variety of local applications, web applications, and/or web services.

BACKGROUND

A runtime environment can enable an application to be integrated into the computing environment of a computing device. Typically, a runtime environment is provided for applications to be implemented natively (i.e. compiled into the machine code of the computing device on which it resides) on a computing device by an operating system. However, other runtime environments can be provided for applications to be implemented non-natively on a computing device, such as web applications that can operate within a virtual machine provided by a web browser that operates natively on a computing device.

A web browser is an application that typically retrieves and presents information found on web pages maintained by content servers over a network. A web page is typically stored as one or more text files formatted in browser supported formats such as but not limited to markup languages (such as but not limited to HyperText Markup Language (HTML) as defined by the World Wide Web Consortium), scripts (such as but not limited to JavaScript and/or other scripts that incorporate ECMAScript as defined by the ECMA TC-39 committee of the Mozilla Foundation) and style sheets (such as but not limited to cascading style sheets (CSS) as defined by the World Wide Web Consortium) that can be displayed by a web browser.

SUMMARY OF THE INVENTION

Systems and methods for alert management in accordance with embodiments of the invention are disclosed. In one embodiment, a computing device includes a processor, storage, an operating system stored within the storage, where the operating system configures the processor to create a computing environment, an alert platform application stored in the storage, where the alert platform application includes a rendering engine process configured to render pages within the computing environment created by the operating system by interpreting instructions written in a rendering language and implement a virtual machine configured to execute instructions written in a scripting language and an integration process that enables instructions executing within the virtual machine to modify the computing environment, an alert pop up page file stored within the storage and containing instructions written in the rendering language that cause the rendering engine process to render a pop up page within the computing environment of the computing device, and an alert history database containing alert data including an alert ID, display metadata, and application data, where the display metadata for a piece of alert data can include an alert ID, and a timestamp indicating when the alert was generated, wherein the alert history database is configured to be queried to retrieve alert data, wherein the alert platform application is configured to receive alert messages containing alert data that can include an alert ID, display metadata, and application data from a plurality of applications, store the received alert data within the alert history database, and query the alert history database to retrieve alert data, and wherein the alert platform application is configured to inject at least a portion of display metadata from alert data retrieved from the alert history database into the instructions written in the rendering language from the alert pop up page file and render an alert pop up page containing the injected alert data within the computing environment of the computing device using the rendering engine process.

In another embodiment of the invention, the alert platform application is at least partially natively implemented and creates an application runtime environment when executed by the computing device, the computing device further including at least one cross-platform application stored in the storage of the computing device, where a given cross-platform application includes an application alert pop up page file containing instructions written in the rendering language that cause the rendering engine process to render a pop up page within the computing environment of the computing device, a background page file including executable instructions in the scripting language configured to be executed within the virtual machine to control the execution of the cross-platform application in accordance with the logic of the cross-platform application, cause the rendering engine process to render the application alert pop up page within the computing environment of the computing device using the application alert pop up page file, and provide an alert message to the alert platform application in response to an alert event, where the alert includes alert data including an alert ID, display metadata, and application data.

In an additional embodiment of the invention, execution of the executable instructions in the background page file within the virtual machine causes the cross-platform application to request alert data from the alert platform application.

In yet another additional embodiment of the invention, the requested alert data includes display metadata and application data, where the application data includes executable instructions in the scripting language, the logic of the background page is configured to inject at least a portion of the display metadata into the alert pop up page and cause the rendering of the alert pop up page using the rendering engine process, and the logic of the background page configures the rendering engine process to execute the executable instructions within the scripting language within the virtual machine in response to a specific user interaction with the rendered alert pop up page.

In still another additional embodiment of the invention, the display metadata of a piece of alert data includes metadata selected from the group consisting of: an alert title, an alert description, an alert timestamp indicating when the alert occurred, an application ID indicating the application that generated the alert, an alert priority, and a reference to at least one image file.

In yet still another additional embodiment of the invention, the display metadata includes a resource locator and the alert platform application is configured to invoke a call to an API that produces resources that can be rendered for display.

In yet another embodiment of the invention, the resources include at least one piece of data selected from the group consisting of text, an image, and executable instructions in the scripting language.

In still another embodiment of the invention, the resources are stored locally.

In yet still another embodiment of the invention, the resources are retrieved from a remote server.

In yet another additional embodiment of the invention, the cross-platform application further includes an image file containing an icon, the integration layer process is configured to create a launch point incorporating the icon within the computing environment of the computing device for the cross-platform application using the image file, and the alert platform is configured to display at least one badge on the icon in response to receipt of an alert message.

In still another additional embodiment of the invention, the computing device further includes at least one native application configured to execute natively within the computing device by executing within the computing environment generated by the operating system and wherein the at least one native application is configured to provide an alert to the alert platform application in response to an alert event, where the alert includes alert data configured to be rendered for display in a user interface using the rendering engine process.

In yet still another additional embodiment of the invention, the display metadata of a piece of alert data includes metadata selected from the group consisting of: an alert title, an alert description, an alert timestamp indicating when the alert occurred, an application ID indicating the application that generated the alert, an alert priority, and a reference to at least one image file.

In yet another embodiment of the invention, the display metadata includes a resource locator and the alert platform application is configured to invoke a call to an API that produces resources that can be rendered for display.

In still another embodiment of the invention, the resources include at least one piece of data selected from the group consisting of text, an image, and executable instructions in the scripting language.

In yet still another embodiment of the invention, the resources are stored locally.

In yet another additional embodiment of the invention, the resources are retrieved from a remote server.

In still another additional embodiment of the invention, the alert platform application is further configured to generate display metadata in response to receipt of an alert from an application including at least one piece of metadata selected from the group consisting of: an alert ID, a timestamp indicating the time the alert was generated, and an application identifier.

In yet still another additional embodiment of the invention, the alert platform application is configured to receive alerts from at least one application from the group consisting of local native applications, local cross-platform application, web applications and web services.

In yet another embodiment of the invention, the alert platform application is configured to receive alerts from an alert synchronization server that synchronizes alert data across multiple alert platforms.

In still another embodiment of the invention, the instructions in the rendering language in the pop up page are written so that the pop up page is rendered as a message notification center in which display metadata from alert data generated by multiple applications is inserted by the alert platform application.

In yet still another embodiment of the invention, the scripting language is JavaScript and the rendering language is HTML.

Still another embodiment of the invention includes a method of managing alerts using an alert platform application executing on a computing device, the method including executing an alert platform application including a rendering engine process configured to render pages within the computing environment created by the operating system by interpreting instructions written in a rendering language and implement a virtual machine configured to execute instructions written in a scripting language, and an integration process that enables instructions executing within the virtual machine to modify the computing environment, executing executable instructions written in a scripting language and contained within a locally stored background page file within the virtual machine, where the executable instructions cause the computing device to render instructions written in a rendering language contained within a pop up page file using the rendering engine process to create a pop up page within the computing environment of the computing device and provide an alert to an application platform application in response to an alert event, where the alert includes alert data configured to be rendered for display by the rendering engine process, and storing the alert within an alert history database containing alerts, and alert metadata using the application platform application, where the alert metadata identifies an application that generated an alert and a timestamp indicating when the alert was generated, and querying the alert history database to retrieve at least one alert using the application platform application.

In yet another additional embodiment of the invention, the application platform application further includes an alert pop up page file containing instructions in the rendering language that cause the rendering engine to render a pop up page containing at least one alert within the computing environment of the computing device and the method further includes injecting at least a portion of alert data from the retrieved at least one alert into the instructions in the rendering language from the alert pop up page file and rendering the alert pop up page containing the injected alert data within the computing environment of the computing device using the rendering engine process.

In still another additional embodiment of the invention, the pop up page file contains instructions in the rendering language that cause the rendering engine to render a pop up page containing at least one alert within the computing environment of the computing device and the method further includes injecting at least a portion of alert data from the retrieved at least one alert into the instructions in the rendering language from the pop up page file and rendering the pop up page containing the injected alert data within the computing environment of the computing device using the rendering engine process.

In yet still another additional embodiment of the invention, executing executable instructions written in a scripting language and contained within a locally stored background page file further configures the computing device to generate alert metadata in response to an alert event and provide the alert metadata to the application platform application.

In yet another embodiment of the invention, the method further includes generating alert metadata in response to receipt of an alert from an application using the application platform application.

DETAILED DESCRIPTION

Figure 1:
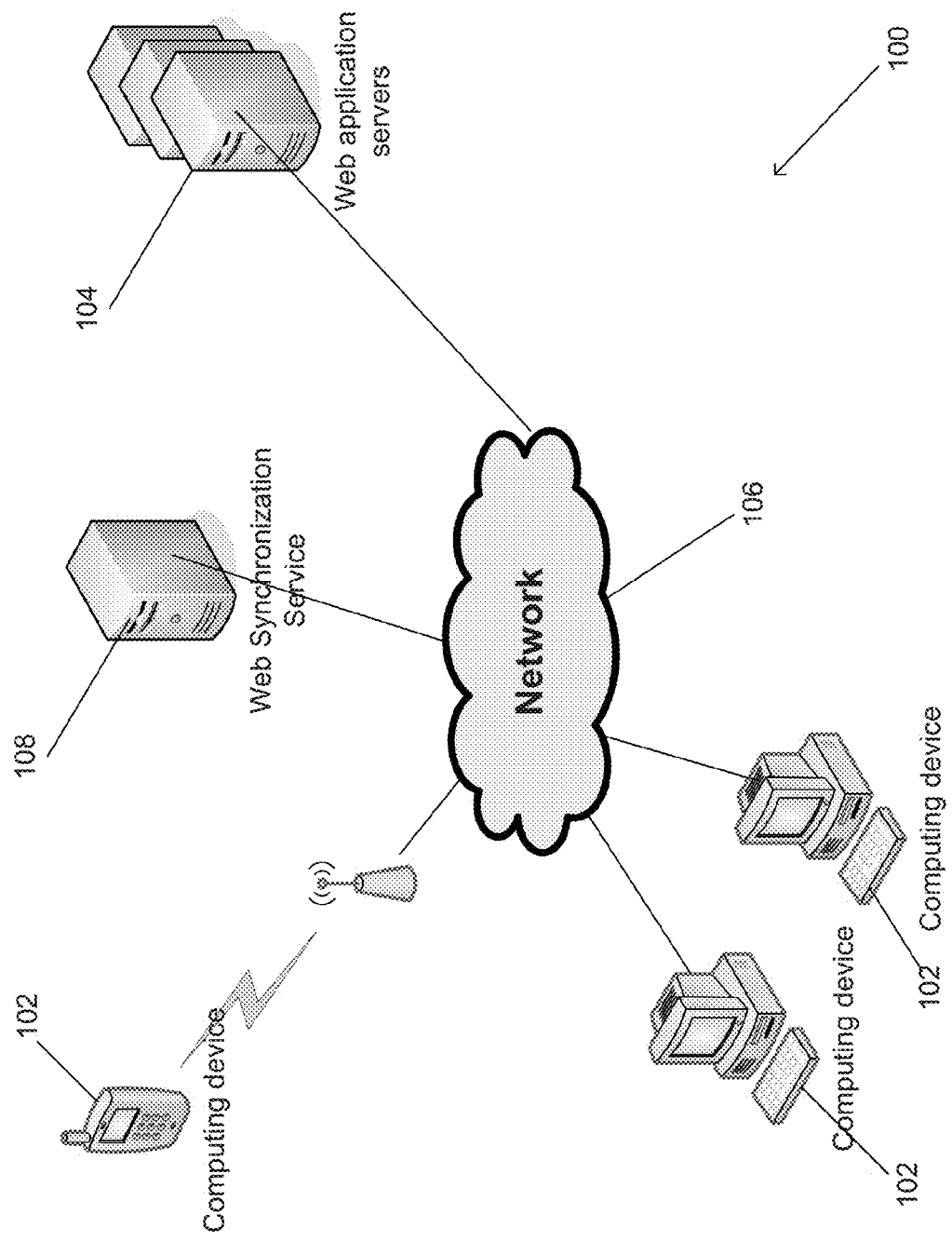
FIG. 1 is a network diagram illustrating computing devices in which an application platform application can perform processes for application alert management in accordance with an embodiment of the invention.

Turning now to the drawings, systems and methods for managing application alerts using an alert platform in accordance with embodiments of the invention are illustrated. An alert can be considered to be a message containing structured alert data or a block of alert data pulled from a web service including information that can be formatted for display within a user interface. An alert platform aggregates alert data and provides alert data upon request to applications for use in interactions with users and/or the alert platform displays retrieved alert data within a user's computing environment in a way that enables user interaction. In many embodiments, the alerts are identified by an alert ID and contain a set of display metadata and optional application data. In several embodiments, the alert ID can be provided by the application or service that generated the alert and/or by the alert platform. In many embodiments, display metadata can include information that the alert platform can use to display an alert within a user's computing environment, such as (but not limited to) an alert title, an alert description, an alert timestamp indicating when the alert occurred, an application ID indicating the application that generated the alert, an alert priority, and a reference to one or more image files such as an avatar or an icon. The manner in which the alert platform can utilize display metadata within a user interface includes (but is not limited to) aggregating alerts in an alert notification center, displaying individual alerts within windows within a user's computing environment, and displaying badges on icons within the user's computing environment. Any of a variety of mechanisms can be utilized to display the alerts including injecting the display metadata into pages of instructions in a rendering language and then rendering the pages, using the display metadata to render user interfaces using the native graphics of the computing device, using a combination of the computing device's native graphics capabilities in combination with instructions in a scripting language, and/or a combination of a rendering engine and a native rendering of a user interface. In other embodiments, any of a variety of native, scripting, rendering engine system alone or in combination can be utilized to render user interfaces incorporating display metadata received by an alert platform. In a number of embodiments, the application data is data that the alert platform can pass to an application. In several embodiments, the alert platform passes the application data to an application in response to user interaction with the displayed alert. The application data can enable applications to interact in complex ways with the alert platform and the user. In certain embodiments, the alert platform can support various types of alerts that contain different types of alert metadata and/or application data.

In several embodiments, alert platforms manage alerts from a variety of applications including (but not limited to) local native applications, cross platform applications, web applications and/or web services. Accordingly, references to applications that provide alerts to an alert platform should be understood as encompassing not just local applications, but natively implemented local applications, local cross-platform applications, hosted cross-platform applications, web applications, web pages, web services and/or any other process running on a computing device (general computing, embedded or otherwise) capable of providing alert data to an alert platform in accordance with an embodiment of the invention.

In a number of embodiments, the alert platform communicates with a web service that synchronizes alerts across multiple computing devices. In several embodiments, the user maintains a user account with the web service and alert IDs assigned to alerts are unique with respect to a specific user account to facilitate synchronization of alerts. In certain embodiments, an alert platform can be configured to transmit alerts via a web based alert synchronization service to multiple users registered with the web service. In this way, an application platform on a single computing device can store and display alerts received by multiple user devices, including devices configured by application platforms registered to other users.

In many embodiments, the alert platform manages the display of alerts generated by applications by building an alert history for all alerts received by the alert platform, whether directly from applications or via the web service. In certain embodiments, alerts are stored as an alert history using a relational database management system such as (but not limited to) a Structured Query Language (SQL) database or a SQLite database. By creating a searchable alert history, the alert platform application can be utilized to query alerts from a particular application, groups of applications or across all applications. In embodiments where the alert platform subscribes to a web service that synchronizes alerts across multiple devices associated with a user, the alert history on each device can be utilized to search for alerts received by an alert platform on any of the devices. In certain embodiments, alerts stored in an alert history by an application platform and/or a web service can be searched and/or analyzed to customize future alerts that are presented to the user.

In a number of embodiments, the alert platform generates interaction metadata concerning user interactions with alerts and the interaction metadata is associated with one or more alerts within the alert history database (or elsewhere). The interaction metadata can be utilized by the alert history database in identifying alerts to display and in responding to queries.

Requests for alert data and to display alerts can originate from the user and/or other sources, such as (but not limited to) an application. In many embodiments, the alert platform provides the ability for applications to query the alert history to obtain interaction metadata, and aggregations of alert data or interaction metadata.

In many embodiments, an alert platform is implemented using an alert platform application that provides an intuitive interface that is integrated with the computing environment of a device's operating system, which enables the user receive alerts from a variety of applications. In numerous embodiments, an alert platform application includes a rendering engine process. The rendering engine process utilizes various parsers and virtual machines associated with supporting specific web technologies including but not limited to HTML, JavaScript, and CSS to format display metadata from an alert for display in a user interface. In a number of embodiments, the alert platform also includes an integration layer process that can make modifications to a user's computing environment or can call services from other applications. In several embodiments, the integration layer process exposes a number of APIs that can be called by applications to provide alerts to the alert platform. In many embodiments, the integration layer APIs are JavaScript APIs. In response to API calls, the integration layer can communicate with the operating system and/or natively implemented processes to modify the user's computing environment or call upon services from other applications. In a number of embodiments, the alert platform is implemented as part of an application platform configured to create a runtime environment in which non-native cross-platform applications can execute similar to the applications described in U.S. application Ser. No. 13/164,740 entitled "Systems and Methods for Integration of an Application Runtime Environment into a User Computing Environment", filed Jun. 20, 2011, the disclosure of which is incorporated by reference herein in its entirety. Alert platforms and alert management processes in accordance with embodiments of the invention are discussed further below.

System Architecture

Alert platforms can be implemented using alert platform applications installed on computing devices that receive alerts from applications, store the alerts in an alert history, respond to requests for alert data and display alert data within a user interface. References to displaying alerts can be understood to refer to the process of formatting alert display metadata for display as part of a user interface rendered within a user's computing environment. As noted above, alerts can be received from a variety of applications and can include alert data such as (but not limited to) an alert ID, a set of display metadata, and optional application data. In certain embodiments, the computing devices on which the application platform application executes can communicate via a network with a web based alert synchronization service that enables the synchronization of alerts across multiple computing devices.

A network diagram illustrating an alert management system in accordance with an embodiment of the invention is illustrated in FIG. 1. The alert management system 100 includes a number of computing devices 102 on which alert platform applications are executing; receiving alerts from local applications that also execute on the computing devices, servers (104) on which web applications execute and/or that provide web services. The alert platform applications are configured to store received alerts and alert data pulled from web services in a local alert history. Alert platform applications are also configured to display alerts within a computing environment generated by the operating system of the computing device, and respond to requests for alert data stored in the alert history. In many embodiments, alert platform applications are also configured to communicate via a network, such as the Internet, with a web based alert synchronization service that enables the synchronization of alerts between alert platforms executing on different computing devices. As noted above, the alert synchronization service 108 can enable the creation of user accounts and the registration of alert platforms with the user accounts. In this way, the alert synchronization service can rely on user account information to automatically exchange alert data between registered application platforms. In several embodiments, users can grant permission to share alerts with other users and/or groups of users and the alert synchronization service exchanges alert data in accordance with the sharing permissions.

In a number of embodiments, the alert platform is part of an application platform application that creates an application runtime environment on each computing device 102, which can download one or more cross-platform applications from an application server 104 capable of executing within the application runtime environment. During execution, the applications that execute within the runtime environment can download additional information from one or more application servers and can generate alerts that are provided to the alert platform. In several embodiments, the alert platform is at least partially implemented using a cross-platform application that is configured to render user interface pages such as (but not limited to) a message notification center page and individual pop up alerts. Pages rendered by an alert platform can enable interactive engagement with alerts by users.

Although specific systems that utilize alert platform applications to perform alert management processes are discussed above, systems that are capable of performing alert management processes can be implemented in any manner as appropriate to the requirements of specific applications in accordance with embodiments of the invention. The use of alert platform applications to perform alert management processes in accordance with embodiments of the invention are discussed further below.

Application Alert Management Processes

Application alert management processes in accordance with many embodiments of the invention can be implemented by an alert platform application that stores alerts generated by applications within an alert history. As noted above, application platforms in accordance with many embodiments of the invention receive alerts containing alert data that the application platform stores in an alert history database (such as but not limited to a SQLite database) along with metadata related to the alert data such as, but not limited, interaction metadata that records user interactions with alerts. In certain embodiments, the alerts stored in the alert history are determined based upon one or more predetermined criterion including (but not limited to) the size of the alert history, the number of alerts maintained by a specific application, and/or any other criterion appropriate to the requirements of a specific alert platform in accordance with embodiments of the invention. Storing alert data in a searchable alert history enables retrieval of alerts generated by a single application, groups of applications, or across all applications. The retrieved alert metadata can be displayed by the alert platform within a user's computing environment or provided to another application. In several embodiments, the alert data presented to the user via a user interface can be determined based upon user preferences and/or criteria associated with the alert request. By way of example, criteria associated with an alert request can include (but are not limited to) requests for all recent alerts from all applications, all recent unread alerts, or all generated alerts. In several embodiments, the alert platform is capacity constrained and old alerts are removed from the alert platform and stored in the alert synchronization service. In a number of embodiments, a query to an application platform can also be provided to an alert synchronization service to retrieve alert data stored remotely.

Figure 2:
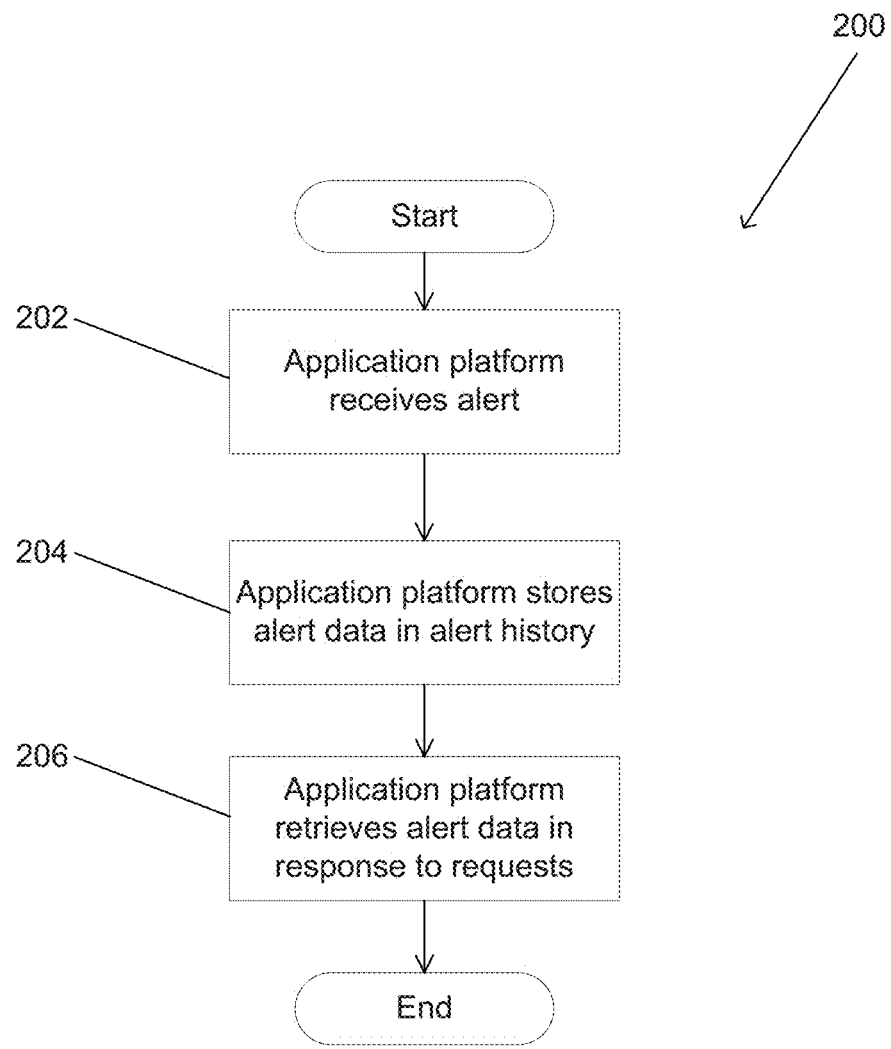
FIG. 2 illustrates a flowchart of a process for application alert management in accordance with an embodiment of the invention.

A process for managing alerts using an alert platform application in accordance with an embodiment of the invention is illustrated in FIG. 2. The process 200 involves the alert platform receiving an (202) alert message form an application. The alert platform can extract alert data from the alert message. In several embodiments, the alert message contains alert data that can be supplemented with additional metadata including (but not limited to) associating an alert ID with the alert data, associating an application ID indicating the application that generated the alert with the alert data, and adding an alert timestamp indicating when the alert occurred to the alert data. The alert data itself can include display metadata that can be utilized to display alert information via a user interface and application data (the structure of which is typically not known to the alert platform). In many embodiments, the display metadata can include information that the alert platform can use to display an alert within a user's computing environment, such as (but not limited to) an alert title, an alert description, an alert timestamp indicating when the alert occurred, an application ID indicating the application that generated the alert, an alert priority, and a reference to one or more image files such as an avatar or an icon. In other embodiments, any display metadata can be incorporated into an alert as appropriate to the requirements of a specific application. The ability to store application data within alerts provides a mechanism by which applications can communicate information. The mechanism is particularly useful, where a web service provides an alert and application data within the alert can be utilized by a local application to respond to the alert. As is discussed further below, the alert platform can be part of an application platform on which cross-platform applications execute. In many embodiments, a web application and/or web service can generate an alert containing application data including instructions in an executable scripting language. An application can query the alert platform to determine whether the web application and/or web service has provided any alerts recently. When the alert is detected, the cross-platform application can render a pop up page incorporating display metadata extracted from the alert data. In addition, executable instructions in the scripting language contained within the application data can be executed in response to a specific user interaction with the user interface rendered by the cross-platform application using the display metadata.

Referring again to FIG. 2, the alert platform application can store (204) the alert in an alert history that is formatted in such a way as to enable the querying of alerts and metadata associated with the alerts such as, but not limited, to interaction metadata. In many embodiments, the alert platform application incorporates a text search engine that indexes keywords within text strings in the alerts to facilitate full text searching. The alert platform application can utilize the structure of the alert history to retrieve (206) alert data in response to requests from users and/or applications.

Although specific processes for managing alerts using alert platform applications are discussed above, processes can be utilized to manage alert data in any manner appropriate to the requirements of specific applications in accordance with embodiments of the invention. Processes for retrieving and displaying alerts using alert platform applications in accordance with embodiments of the invention are discussed below.

Retrieving Alert Data and Displaying Alerts

Alert data stored in an alert history database in accordance with embodiments of the invention can be queried for display by an alert platform application and/or provided to an application, which can display the alert and/or process application data associated with the alert. In addition, the application can respond to interactions with an alert displayed by the application based upon information contained within the application data of the alert. As noted above, in the same way that alerts can be received from a variety of local and remote applications and services, alert data can be requested by a various local and remote applications.

In certain embodiments, the alert platform application queries the database to retrieve alert data matching predetermined criteria including (but not limited to) the alert recency, the alert relevance, prior user interactions, the application that generated the alert, and/or a the application that generated the alert being a member of a specific group of applications. In numerous embodiments, an alert platform can customize the alert data that are displayed to a particular user. In several embodiments, the alert platform application enables automatic and/or manual customization of the alert data displayed to a user and the manner in which the alerts are displayed. In certain embodiments, an alert platform application can automatically customize the alerts that are displayed to a particular user based upon detected trends exhibited by a specific user or class of users. These trends can include but are not limited to placing alerts matching specific criteria at the forefront of a list of alerts or by automatically removing alerts that match other criteria. In a number of embodiments, the display of alerts is determined by the frequency with which users interact with specific types of alerts. In particular embodiments, the selection of alerts for display by an alert platform application can be manually customized by a user. In several embodiments, specific filters utilized by an alert platform application include the application that created alert data, and the timestamp of the alert data. When the alert platform application utilizes an interface in which multiple alerts are displayed, the alert data that is displayed can be sorted by relevant and/or contextually aware. In various embodiments, the time between the generation of alert data associated with a specific application and/or the total number of alerts generated by an application associated with alert data can be utilized in scoring the relevance of an alert. Furthermore, an alert platform application in accordance with embodiments of the invention can perform rate limiting to limit the number of alerts displayed at any given time on a per application basis.

Figure 3:
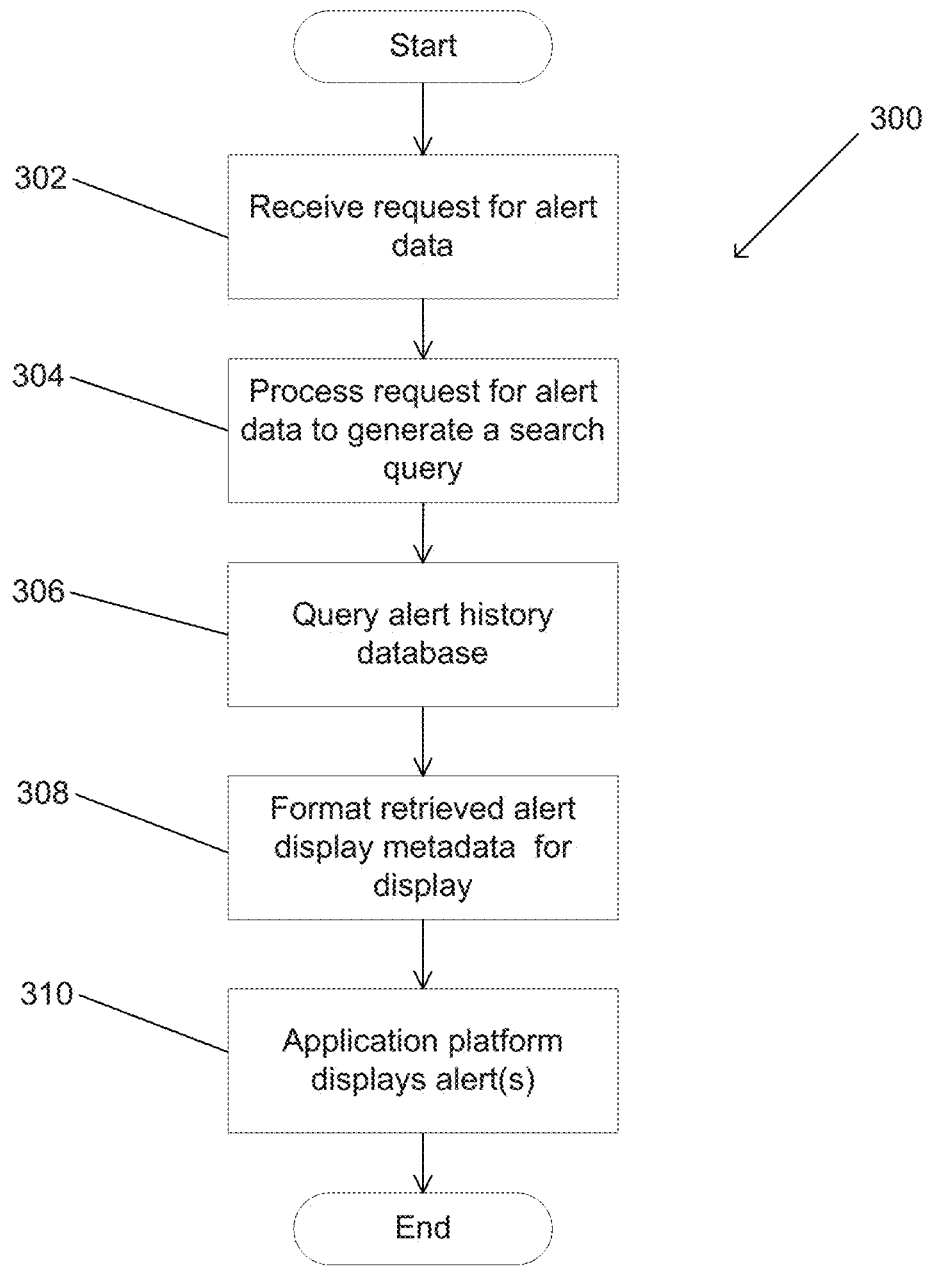
FIG. 3 illustrates a flowchart of a process for an application platform application retrieving and displaying alerts in accordance with an embodiment of the invention.

A process that can be utilized by an alert platform application to retrieve and display alerts in response to an alert request in accordance with an embodiment of the invention is illustrated in FIG. 3. The process 300 includes an alert platform application receiving (302) a request from a user and/or an application to retrieve alert data for display within a user interface generated by the alert platform application. In many embodiments, the user request can be received via a user interface and a request for alert data can be received from applications via an Application Programming Interface (API). In many embodiments, receipt of an alert via an API causes the display of the alert. In certain embodiments, the alert platform application processes (306) the request for alert data to generate a query that can be used to retrieve (306) alert data from the alert history database. In many embodiments, an application is simply requesting alert data and the alert platform can extract the requested data from the retrieved alert data and provide the extracted data to the application. In a number of embodiments, the extracted data is display metadata that can be used by the application to render a user interface containing at least a portion of the display metadata. In several embodiments, the extracted data is application data that can be provided to the application. As noted above, application data can be any data generated by an application including instructions written in a scripting language that can determine the manner in which the application responds to the occurrence of the alert and/or a user's interaction with an alert. In several embodiments, the alert platform does not possess the ability to interpret the application data.

The retrieved alert data can also be formatted (310) by the alert platform application for rendering as a user interface within a user's computing environment. In several embodiments the alert data includes display metadata containing information that the alert platform can use to display an alert within a user's computing environment, such as (but not limited to) an alert title, an alert description, an alert timestamp indicating when the alert occurred, an application ID indicating the application that generated the alert, an alert priority, and a reference to one or more image files such as an avatar or an icon. As noted above, the data that can be included in an alert's display metadata is typically only limited by the display capabilities of the computing device and the constraints of a specific application. In several embodiments, the alert platform application includes a rendering engine process that is configured to interpret instructions written in a rendering language to build a Document Object Model that can be rendered for display. In a number of embodiments, pieces of the display metadata can be injected into the instructions written in the rendering language to cause the rendering engine process to display a user interface containing the injected display metadata. In various embodiments, the display metadata includes a resource locator, such as a URL, that can be used by the alert platform application to invoke a call to an API that retrieves resources (such as but not limited to text, images or URL links) that can be utilized to render a user interface page containing pieces of the display metadata for display by a rendering engine process.

Although specific processes for retrieving and displaying alert data are discussed above, processes for retrieving and displaying alert data alert platform applications executing on computing devices can be implemented in any manner as appropriate to the requirements of a specific application in accordance with embodiments of the invention. User interfaces that can be generated by application platform applications capable of application alert management processes in accordance with embodiments of the invention are illustrated below.

Displaying Alerts within a User Interface Rendered by an Alert Platform

Figure 4:
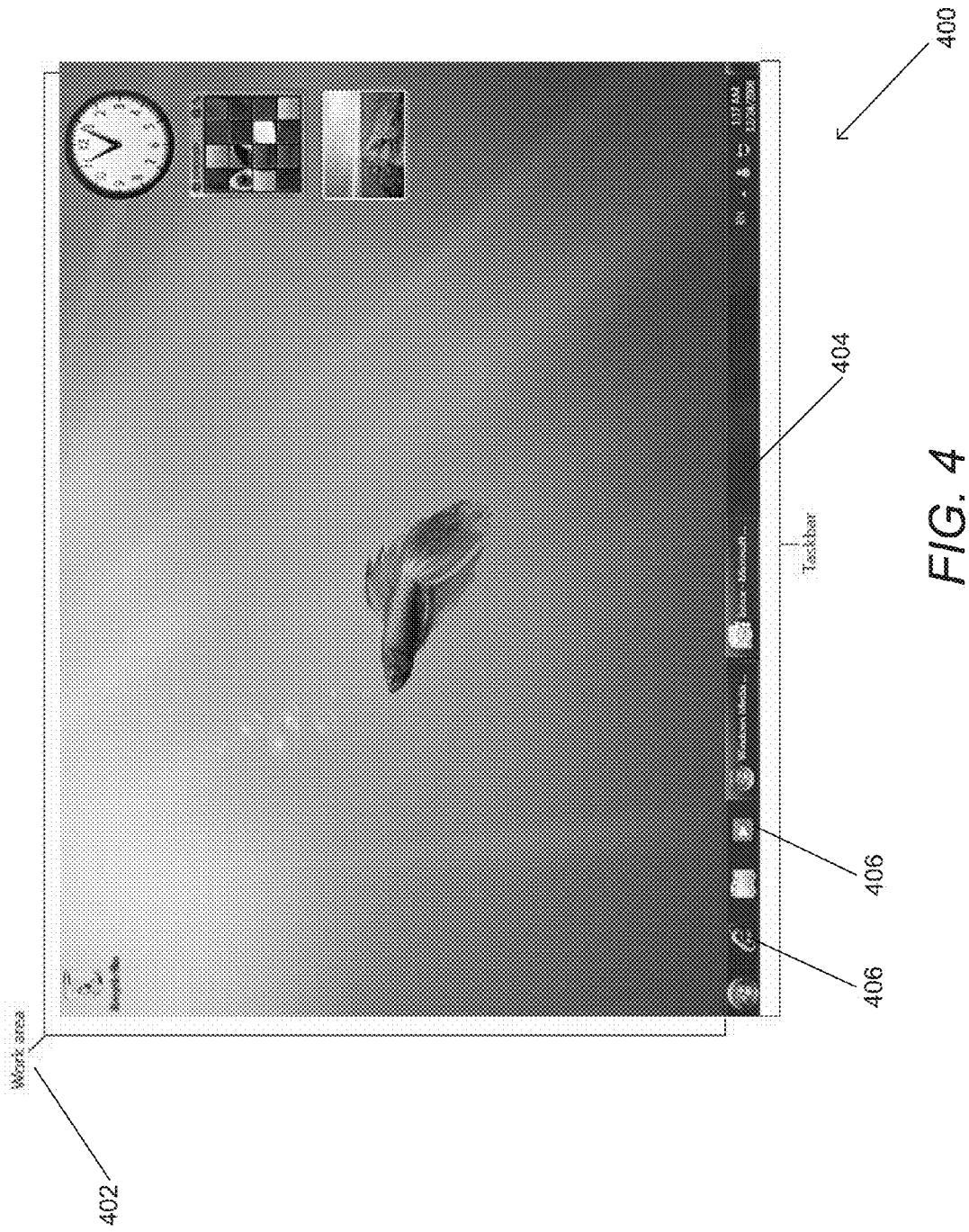
FIG. 4 is a screenshot of a work area and a taskbar in a user interface in accordance with an embodiment of the invention.

Alert management processes in accordance with many embodiments of the invention can enable an alert platform application to display alerts in a useful and intuitive manner to a user. In many embodiments, a user's computing environment can include a work area in which a user can interact with an application and a taskbar in which a user can interact with an alert platform application launch point. A screenshot of a work area and a taskbar in a user interface in accordance with an embodiment of the invention is shown in FIG. 4. The majority of the area of the user interface 400 is taken by the work area 402 while a smaller portion of the user interface is taken by the taskbar 404. A user can interact with an alert platform application in the taskbar 404. In the illustrated embodiment, the alert platform is part of an application platform that provides launch points 406 for various applications that instruct the application platform to launch a particular application.

Figure 5:
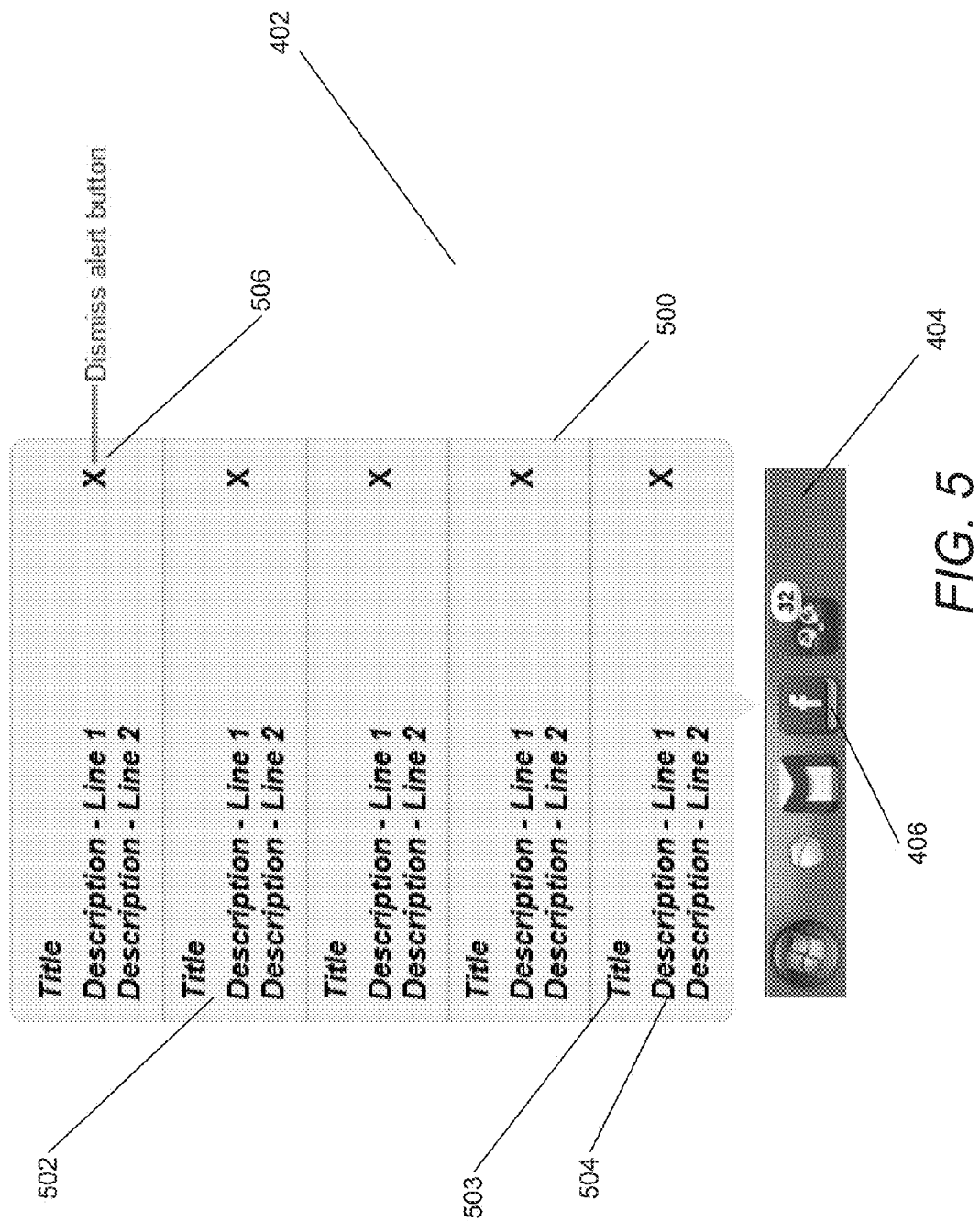
FIG. 5 is a conceptual illustration of a screenshot illustrating how an application's alert history is displayed within a user interface in accordance with an embodiment of the invention.

Display metadata retrieved from an alert history can be formatted for display within the work area 402 of the user computing environment in accordance with many embodiments of the invention while still being associated with the launch point 406 of an application in the taskbar. A conceptual illustration of a screenshot of alerts from an application's alert history displayed in accordance with an embodiment of the invention is illustrated in FIG. 5. The application's alert history 500 is displayed in the work area 402 but graphically illustrates an association with a particular application 4406 (via a launch point) in the taskbar. The rendered alerts 500 user interface lists all recent alerts 502 generated by the application. The list of alerts is generated by querying the alert history according to an alert request for recent alerts from a particular application. In the illustrated embodiment, a title string 503 and a description string 504 from the display metadata of each alert is formatted into a template for rending within the user's computing environment. In several embodiments, the alert platform includes a rendering engine layer that is configured to interpret instructions written in a rendering language as pop-up windows within a user's computing environment. In many embodiments, the display metadata from the alert data retrieved from the alert history can be injected into a template defined using instructions in the rendering language and the rendering engine process can render a user interface containing the injected display metadata using the modified template. A user can customize the alerts 500 displayed from the alert history by selecting a button 506 to dismiss an alert from being displayed, leaving only the alerts that the user wishes to remain displayed. In certain embodiments, there may be no alerts for display from an application's alert history. In a number of embodiments, all user interactions with alerts displayed via the alert platform and/or applications executing within the computing environment are tracked in the form of interaction metadata that is associated with the alert within the alert history. A web based alert synchronization service can also enable an alert history to store interaction data related to user interactions with alerts on other computing devices. As discussed above, the interaction data can be used as a data dimension that can be queried when retrieving alert data from the alert history.

Figure 6:
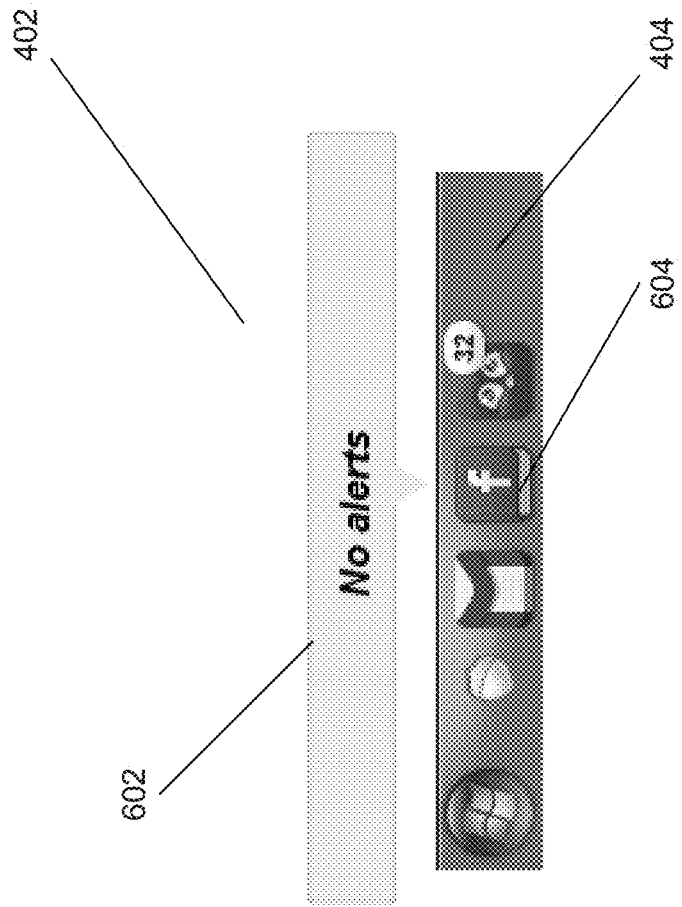
FIG. 6 is a conceptual illustration of a screenshot illustrating an application's alert history with no alerts in accordance with an embodiment of the invention.

A conceptual illustration of a screenshot of an alert request that results in no alerts to display from an alert history in accordance with an embodiment of the invention is illustrated in FIG. 6. Similar to the alerts displayed in FIG. 5, the indication 602 that there are no alerts for display with respect to a specific application is illustrated within the work area with an association with a particular application from the application's launch point 604 in the taskbar.

Figure 7:
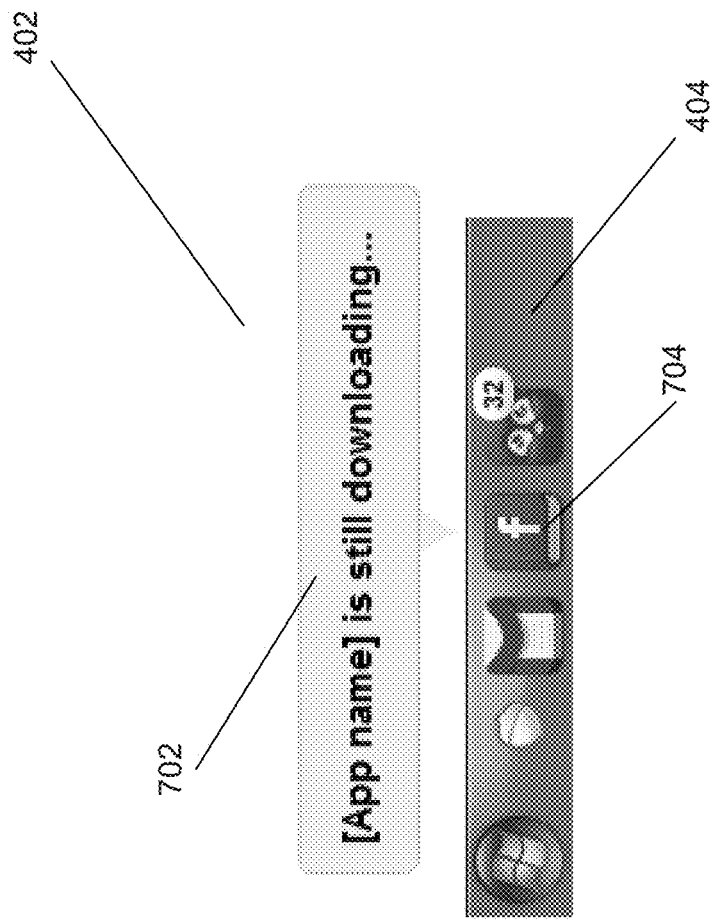
FIG. 7 is a conceptual illustration of a screenshot illustrating how an alert concerning an application's lifecycle status is displayed in accordance with an embodiment of the invention.

In various embodiments, the alert platform can query the alert history for specific types of alerts. For example, the alert platform can query the alert history for the most recent alert data containing display metadata concerning an application's lifecycle status. A conceptual illustration of a screenshot of a user interface page rendered using alert data injected into the alert page that was retrieved from the alert history based upon recency and subject in response to a request for information concerning an application's lifecycle status in accordance with an embodiment of the invention is illustrated in FIG. 7. The alert 702 is displayed within the work area 402 of a user interface with a graphical reference to the particular application related to the alert from the application's launch point 704. The display of the alert is customized for an alert request for the latest alert concerning the application's life cycle by displaying an alert 704 that the application is still downloading.

In several embodiments, an alert can display one or more images that provide a user with an intuitive and useful user interface. In certain embodiments, the display of one or more images can include the display of an icon image associated with the application that generated the alert. In many embodiments, an image file containing an icon image for an application is locally stored and the alert platform application renders the icon image in a displayed alert using the locally stored image file. In particular embodiments, multiple overlaid images and/or an animated image are displayed that provide a user with information such as (but not limited to) the context of an alert along with the application that created the alert. For example, an icon image can be displayed with a profile picture of a user to indicate the application and the user action that triggered an alert. In other embodiments, any of a variety of images appropriate to the requirements of a specific application can be displayed including (but not limited to) images that are downloaded from remote servers using resource locators contained within the display metadata of the alert data. In many embodiments, image files containing images are bundled with alerts provided by applications.

Figure 8A:
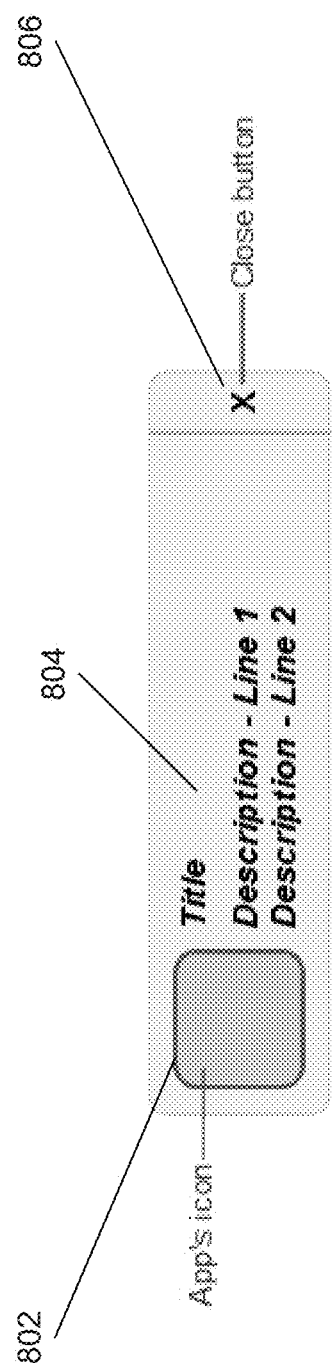
FIG. 8A is a conceptual illustration of a screenshot of an alert including an image from the application that generated the alert in accordance with an embodiment of the invention.
Figure 8B:
FIG. 8B is a screenshot of an alert including an icon image overlaid over a profile picture image and textual information in accordance with an embodiment of the invention.

In numerous embodiments, images included in an alert provided to the alert platform application can be retrieved by an application utilizing an API call to a server system based upon a resource locator contained within the display metadata of an alert. A conceptual illustration of a screenshot of a page rendered using display metadata in which images are displayed in accordance with an embodiment of the invention is illustrated in FIG. 8A. The alert includes an icon 802 of the application that created the alert as well as the title and a description of the alert 804. The alert also includes a close button 806 that enables a user to dismiss the alert from being displayed. A screenshot of an alert including multiple overlaid images and textual information is illustrated in FIG. 8B. The screenshot illustrates an alert generated by an application that utilizes the Twitter service maintained by Twitter, Inc. headquartered in San Francisco, Calif., USA. The alert includes both textual information 854 as well as overlaid images 852. The overlaid images 852 provide context for the alert as a combination of an icon from the application that created the alert and a profile picture from a user of the Twitter service. The application retrieves an image file containing the profile picture via an API provided by the Twitter service and provides (or identifies the location of) the image file and the locally stored image file containing the icon to the alert platform application, which generates and displays the illustrated alert.

In many embodiments, a user interface can display alerts across multiple applications that can be synchronized across multiple devices and/or users using an alert synchronization server. Thereby, a user can view all alerts across multiple or even all applications simultaneously. Alerts can be organized for display in any manner, such as being ordered chronologically, by relevancy, by context, by an application priority contained within the alert's display metadata, or by application. The alert platform application can determine the layout of a user interface including alert data based on (but not limited to) the number of alerts displayed per application and the priority of the displayed alerts and/or applications. In a number of embodiments, the alert application platform can customize the layout of the displayed alert data based upon the relevance of the alert data, the context, user intent, display metadata defined priority and/or any of a variety of other factors appropriate to the requirements of a specific application.

In several embodiments, alert data is displayed as part of a notification center user interface where alert data from multiple applications can be displayed in conjunction with launch points for various applications.

Figure 9:
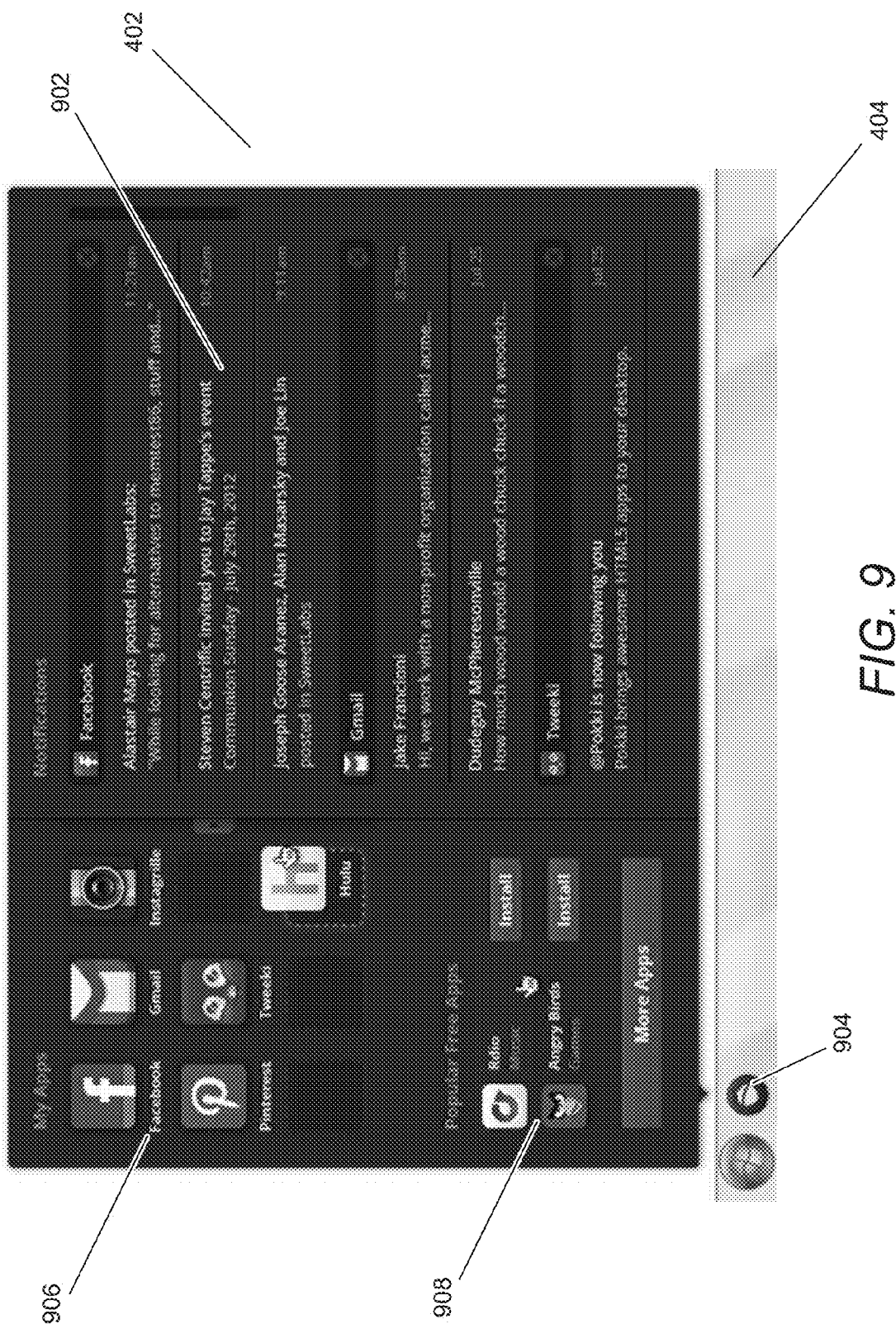
FIG. 9 is a screenshot of a user interface of an application platform application with alerts displayed across multiple applications in accordance with an embodiment of the invention.

A screenshot of a user interface incorporating alert data rendered by an alert platform that is part of an application platform in accordance with an embodiment of the invention is illustrated in FIG. 9. In the illustrated embodiment, display metadata associated with alert data generated by multiple applications is retrieved from an alert history and formatted for display within a notification center user interface. The alerts 902 are retrieved and displayed within the work area of a user interface from a user selecting an icon 904 within the taskbar (e.g. an application associated with the application platform application and/or an alert center). The alerts are displayed by application in chronological order. Additional functionality is also displayed alongside the display of the alerts, such as a display of the applications that currently utilize 906 or that may utilize 908 the runtime of the application platform application.

Although specific implementations of user interfaces from application platform applications that utilize application alert management processes are discussed above, application platform applications that utilize application alert management processes can utilize any user interface in any manner as appropriate to a specific application in embodiments of the invention. Application platform applications capable of application alert management in accordance with embodiments of the invention are described below.

Application Platform Applications

In several embodiments, the alert platform is part of an application platform application that provides a runtime environment in which cross-platform application can execute. Cross-platform applications capable of executing within the runtime environment provided by the application platform application include can be implemented using web technologies including but not limited to HTML, JavaScript, and/or CSSs. An application platform application capable of providing a runtime environment for cross-platform applications can be implemented using a rendering engine process. In several embodiments, the application platform also incorporates an integration process. The rendering engine process is able to perform all of the functions of the rendering engine of a web browser, enabling execution of cross-platform applications implemented using web technologies in a similar way to the manner in which web applications execute within a web browser application, i.e. without the need for a user to launch a web browser application. In a number of embodiments, the rendering engine process includes various parsers and virtual machines associated with supporting specific web technologies including but not limited to HTML, JavaScript, and CSS. The rendering engine process of an application platform application can interpret a cross-platform application in a manner similar to the manner in which the rendering engine of a web browser enables the execution of a web application. Indeed, many embodiments of the invention utilize a modified version of a rendering engine developed for use in a web browser. For example, a modified version of the WebKit or WebKit2 rendering engines can be used to implement a rendering engine process in accordance with an embodiment of the invention. In several embodiments, the alert platform utilizes the rendering engine process to render user interface pages within a user's computing environment based upon display metadata injected into instructions in a rendering language. The manner in which an alert platform can utilize the rendering engine process and integration layer of an application platform application to receive, store, retrieve and display alert data in accordance with embodiments of the invention is discussed further below. In other embodiments, any of a variety of mechanisms can be utilized to display the alerts including using the display metadata to render user interfaces using the native graphics of the computing device using windowing calls and/or other appropriate operating mechanism (e.g. Views in OSX) that can vary from one operating system to the next. In several embodiments, user interfaces can be rendered using a combination of the computing device's native graphics capabilities in combination with providing layout instructions in a scripting language, and/or a combination of a rendering engine and a native rendering of a user interface. In other embodiments, any of a variety of native, scripting, rendering engine system alone or in combination can be utilized to render user interfaces incorporating display metadata received by an alert platform.

The integration layer process enables the integration of an alert platform and cross-platform applications with a user's desktop computing environment, enabling communication with natively implemented processes to provide functionality including (but not limited to) desktop launch points and alerts based upon data pulled from remote servers by the cross-platform application. In addition, natively implemented applications can use the integration layer to provide alerts to the alert platform via an API within the integration layer. In many embodiments, an integration layer process serves to enable a cross-platform application developed using web technologies to behave within the computing environment as if it is a conventional desktop application. In several embodiments, the integration layer process exposes a number of APIs that can be called by an alert platform and/or a cross-platform application to make modifications to a user's computing environment including APIs that enable the alert platform and/or the cross-platform application to provide information to the application platform application, which the application platform application can use to display alerts. In several embodiments, the integration layer process APIs are JavaScript APIs that can be called by the alert platform and various cross-platform applications running within the application runtime environment created by the application platform application. In response to the API calls the integration layer process can communicate with the operating system and/or natively implemented processes to modify the user's computing environment.

In many embodiments, an application platform application enables the integration of an alert platform and cross-platform applications into the computing environment of a user device by exposing a number of APIs that can be called to make modifications to a user's computing environment and/or communicate with operating system processes (or other native processes). In the context of a personal computer, a user's computing environment can include an application platform application installed on a personal computer that enables an alert platform and/or cross-platform applications to modify the desktop computing environment. Application platform applications can also be implemented for installation on other classes of device such as (but not limited to) mobile phones, tablet computers, game consoles, Internet connected televisions and/or consumer electronics devices that do not utilize desktop computing environments.

In numerous embodiments, the alert platform and/or each cross-platform application is continuously active and can continuously communicate with remote servers via a network such as the Internet to receive alert message and/or pull alert data from web services when the application platform application is running. Utilizing the integration with the user's computing environment provided by the application platform application, alert platforms and cross-platform applications can continuously provide alerts based upon information retrieved from the remote servers. In this way, the alert platforms and cross-platform applications can be used to extend web applications and web services to a user's computing environment.

A desktop computing environment typically includes desktop shortcuts, favorites, taskbar icons, and/or a start menu that facilitates functions including but not limited to the launching of desktop applications and the provision of alerts by desktop applications. In many embodiments, an application platform application enables a alert platform and/or cross-platform application to behave within the computing environment as if they are conventional natively implemented desktop applications. For example, an application platform application can enable icons for cross-platform applications to be included in the task bar and/or the start menu of the computing environment. The application platform application enables the alert platform to apply badges or alerts to the icons in response to receipt of alert messages and/or pulling alert data from web services. In many embodiments, the application platform application also enables a cross-platform application to create desktop shortcuts to launch the cross-platform application and can provide shell support for the cross-platform application enabling the cross-platform application or a web application associated with the cross-platform application to be associated with specific file types. In several embodiments, the alert platform and/or cross-platform application is able to behave as if it is a conventional natively implemented desktop application, because the application platform application provides mechanisms by which the alert platform and/or cross-platform application can communicate with operating system processes and/or other natively implemented processes.

In various embodiments, when a cross-platform application is implemented using the same technologies that are utilized to implement web applications, a cross-platform application can be implemented using a background page that contains all of the logic of the cross-platform application. As with a conventional web page, the background page is a text file (as opposed to a binary executable) that can include HTML, JavaScript and/or CSSs that the rendering engine process of the application platform application parses to implement the logic contained therein in a similar fashion to the way in which the rendering engine of a web browser application parses a conventional web page when enabling a web application on a user device.

In addition to a background page, the cross-platform application can also include one or more pop up pages which are similar to a conventional web page and can be displayed to the user to implement alerts and/or a user interface. An alert platform in accordance with embodiments of the invention can also utilize pop up pages to render a user interface with a user's computing environment. In many embodiments, a cross-platform application includes a background page and at least one pop up page that are stored on the computing device. The application platform application process implements the logic contained within the background page and can provide a user interface and/or alerts via various pop up pages. In several embodiments, executable instructions within the background page cause retrieval of information from remote server systems and generate alerts via API calls to the application platform application in response to the retrieved information. In many embodiments, the cross-platform applications provide content including (but not limited to) audio, video, images and/or text to the application platform application, which uses the content to generate alert pop up pages. In several embodiments, the cross-platform applications provide instructions in a scripting language such as (but not limited to) JavaScript that the application platform application uses to determine the manner in which a user can interact with the alert pop up pages (e.g. responses to mouse overs, and/or selections). APIs exposed by the application platform application enable logic within either the background page or the pop up page to modify and respond to interactions with launch points such as (but not limited to) icons within the user's computing environment. For example, the APIs can enable any of the pages associated with the cross-platform application to display alert data within a pop up page by responding to an alert request from a user hovering over or clicking on the cross-platform application's icon by displaying recent alerts associated with that cross-platform application or certain alerts across all applications. In several embodiments, the retrieved alert data includes application data containing executable instructions written in a scripting language that an application can utilize to modify the DOM of its background page and/or pop up page.

While each of the pages associated with a cross-platform application are processed by the application platform application independently and do not necessarily share Document Object Model (DOM) or JavaScript contexts, the pages can communicate with each other using a Remote Procedure Call (RPC) method included in the application platform application APIs, and share data using unified local storage. This allows for a reduction in duplicate data transferring and processing, and may be used to enhance cross-platform application performance by caching data.

In embodiments where the application platform application is implemented using a rendering engine process and an integration layer process, alerts can be provided via both layers. The rendering engine process supports the display of pop up alerts, which can be pop up pages created using web technologies that are displayed to the user (in contrast with the invisible background pages containing the logic of the cross-platform application). The APIs revealed by the integration layer process of the application platform application can also enable the provision of alerts through the user's computing environment using badges and other notification capabilities provided by the operating system of the computing device.

Although specific implementations of application platform applications that utilize application alert management processes are discussed above, application platform applications can utilize application alert management processes in any manner as appropriate to a specific application in embodiments of the invention.

The present invention has been described in certain specific aspects; however, many additional modifications and variations would be apparent to those skilled in the art. For example, any of the various processes described above can be performed in alternative sequences and/or in parallel (on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computing device, comprising:
   a processor;
   storage;
   an operating system stored within the storage, where the operating system configures the processor to create a computing environment;
   an alert platform application stored in the storage, where the alert platform application is configured to create an application runtime environment when executed by the computing device, the alert platform application comprising:
      a rendering engine process configured to:
         render pages within the computing environment created by the operating system by interpreting instructions written in a rendering language; and
         implement a virtual machine configured to execute instructions written in a scripting language; and
      an integration process that enables instructions executing within the virtual machine to modify the computing environment created by the operating system by communicating with operating system processes in the computing environment;
   an alert template stored within the storage and containing instructions written in the rendering language that cause the rendering engine process to render an alert pop up page within the computing environment of the computing device; and
   wherein the alert platform application is configured to:
      receive alert messages containing alert data from a plurality of applications, wherein:
         the alert data comprises an alert ID, display metadata, and application data; and
         the display metadata for a piece of alert data comprises instructions that the alert platform application can use to render an alert within an alert pop up page rendered within the computing environment;
      modify the alert template based on the display metadata contained within the alert data; and
      render an alert pop up page within the computing environment of the computing device using the rendering engine process, where the alert pop up page comprises alert data from at least a portion of the received alert data and the format of the displayed alert data is based on the modified alert template.

2. The computing device of claim 1, wherein:
the alert platform application is at least partially natively implemented;
the computing device further comprising at least one cross-platform application stored in the storage of the computing device, where a given cross-platform application comprises:
an application alert pop up page file containing instructions written in the rendering language that cause the rendering engine process to render a pop up page within the computing environment of the computing device; and
a background page file including executable instructions in the scripting language configured to be executed within the application runtime environment created by the alert platform application to:
control the execution of the cross-platform application in accordance with the logic of the cross-platform application;
cause the rendering engine process to render the application alert pop up page within the computing environment of the computing device using the application alert pop up page file; and
provide an alert message to the alert platform application in response to an alert event, where the alert comprises alert data comprising an alert ID, display metadata, and application data.

3. The computing device of claim 2, wherein execution of the executable instructions in the background page file within the virtual machine causes the cross-platform application to request alert data from the alert platform application.

4. The computing device of claim 3, wherein:
the requested alert data comprises display metadata and application data, where the application data includes executable instructions in the scripting language;
the logic of the background page is configured to inject at least a portion of the display metadata into instructions written in the rendering language based on the alert template to cause the rendering of the alert pop up page using the rendering engine process; and
the logic of the background page configures the rendering engine process to execute the executable instructions written in the scripting language within the virtual machine in response to a specific user interaction with the rendered alert pop up page.

5. The computing device of claim 4, wherein the display metadata includes a resource locator and the alert platform application is configured to invoke a call to an API that produces resources that can be rendered for display.

6. The computing device of claim 5, wherein the resources include at least one piece of data selected from the group consisting of text, an image, and executable instructions in the scripting language.

7. The computing device of claim 5, wherein the resources are stored locally.

8. The computing device of claim 6, wherein the resources are retrieved from a remote server.

9. The computing device of claim 3, wherein the rendering engine process is configured to utilize web technologies to format the injected display metadata within the rendering of the alert pop up page.

10. The computing device of claim 2, wherein:
the cross-platform application further comprises an image file containing an icon;
the integration layer process is configured to create a launch point incorporating the icon within the computing environment of the computing device for the cross-platform application using the image file; and
the alert platform is configured to display at least one badge on the icon in response to receipt of an alert message.

11. The computing device of claim 2, further comprising:
at least one native application configured to execute natively within the computing device by executing within the computing environment generated by the operating system; and
wherein the at least one native application is configured to provide an alert to the alert platform application in response to an alert event, where the alert comprises alert data configured to be rendered for display in a user interface using the rendering engine process.

12. The computing device of claim 1, further comprising an alert history database configured to store alert data comprising an alert ID, display metadata, and application data;
wherein the alert platform application is configured to:
store the received alert messages using the alert history database; and
query the alert history database to obtain the alert data rendered in the alert pop up page.

13. The computing device of claim 1, wherein the display metadata of a piece of alert data comprises metadata selected from the group consisting of: an alert title, an alert description, an alert timestamp indicating when the alert occurred, an application ID indicating the application that generated the alert, an alert priority, and a reference to at least one image file.

14. The computing device of claim 13, wherein the resources include at least one piece of data selected from the group consisting of text, an image, and executable instructions in the scripting language.

15. The computing device of claim 13, wherein the resources are stored locally.

16. The computing device of claim 13, wherein the resources are retrieved from a remote server.

17. The computing device of claim 1, wherein the display metadata includes a resource locator and the alert platform application is configured to invoke a call to an API that produces resources that can be rendered for display.

18. The computing device of claim 1, wherein the alert platform application is further configured to generate display metadata in response to receipt of an alert from an application including at least one piece of metadata selected from the group consisting of: an alert ID; a timestamp indicating the time the alert was generated; and an application identifier.

19. The computing device of claim 1, wherein the alert platform application is configured to receive alerts from at least one application from the group consisting of local native applications, local cross-platform application, web applications and web services.

20. The computing device of claim 1, wherein the alert platform application is configured to receive alerts from an alert synchronization server that synchronizes alert data across multiple alert platforms.

21. The computing device of claim 1, wherein the instructions in the rendering language in the pop up page are written so that the pop up page is rendered as a message notification center in which display metadata from alert data generated by multiple applications is inserted by the alert platform application.

22. The computing device of claim 1, wherein the scripting language is JavaScript and the rendering language is HTML.

23. The computing device of claim 1, wherein the format of the displayed alert data is controlled by a specific application in the plurality of applications providing the alert data via the display metadata contained within the alert data provided by the specific application.

24. A method for rendering alerts, comprising:
receiving alert messages containing alert data from a plurality of applications using a computing device, wherein:
the alert data comprises an alert ID, display metadata, and application data; and
the display metadata for a piece of alert data comprises instructions that the alert platform application can use to render an alert within an alert pop up page rendered within a computing environment created by an operating system executed using the computing device;
the computing device comprises an alert platform application configured to create an application runtime environment when executed by the computing device, the alert platform application comprising:
a rendering engine process configured to:
render pages within the computing environment created by the operating system by interpreting instructions written in a rendering language; and
implement a virtual machine configured to execute instructions written in a scripting language; and
an integration process that enables instructions executing within the virtual machine to modify the computing environment created by the operating system by communicating with operating system processes in the computing environment;
modifying an alert template based on the display metadata contained within the alert data using the computing device, where the alert template contains instructions written in the rendering language that cause the rendering engine process to render an alert pop up page within the computing environment of the computing device; and
rendering an alert pop up page within the computing environment using the computing device, where the alert pop up page comprises alert data from at least a portion of the received alert data and the format of the displayed alert data is based on the modified alert template.

* * * * *